United States Patent [19]

Mortimore

[11] 4,175,341
[45] Nov. 27, 1979

[54] SUBSURFACE CUTTING TOOL FOR A TRACTOR RIPPER SHANK

[76] Inventor: William M. Mortimore, 38474 McKenzie Hwy., Springfield, Oreg. 97477

[21] Appl. No.: 866,549

[22] Filed: Jan. 3, 1978

[51] Int. Cl.² .................................................. E02F 9/28
[52] U.S. Cl. .................................... 37/2 R; 172/719
[58] Field of Search .............. 172/699, 700, 770, 719, 172/724, 713; 37/2 R, 142 R, 141 R

[56] References Cited

U.S. PATENT DOCUMENTS

| | | | |
|---|---|---|---|
| 774,324 | 11/1904 | Hill | 172/699 |
| 2,625,870 | 1/1953 | Peacock | 37/142 R |
| 2,877,572 | 3/1959 | Dyess | 37/2 R |
| 3,085,635 | 4/1963 | Livermore | 172/699 |
| 3,623,247 | 11/1971 | Stepe | 172/713 |

Primary Examiner—Richard J. Johnson
Attorney, Agent, or Firm—James D. Givnan, Jr.

[57] ABSTRACT

A cutting tool for attachment to the end of a tractor mounted ripper shank for use in severing wooden debris below the ground surface. A tool socket receives the lower end of the ripper shank while a blade block secured to the socket is provided with a transverse cutting edge. Inclined gussets extending intermediate the socket and the blade block serve to reinforce the block and further function to impart upward movement to severed debris causing same to be displaced upwardly and outwardly toward the ground surface.

2 Claims, 5 Drawing Figures

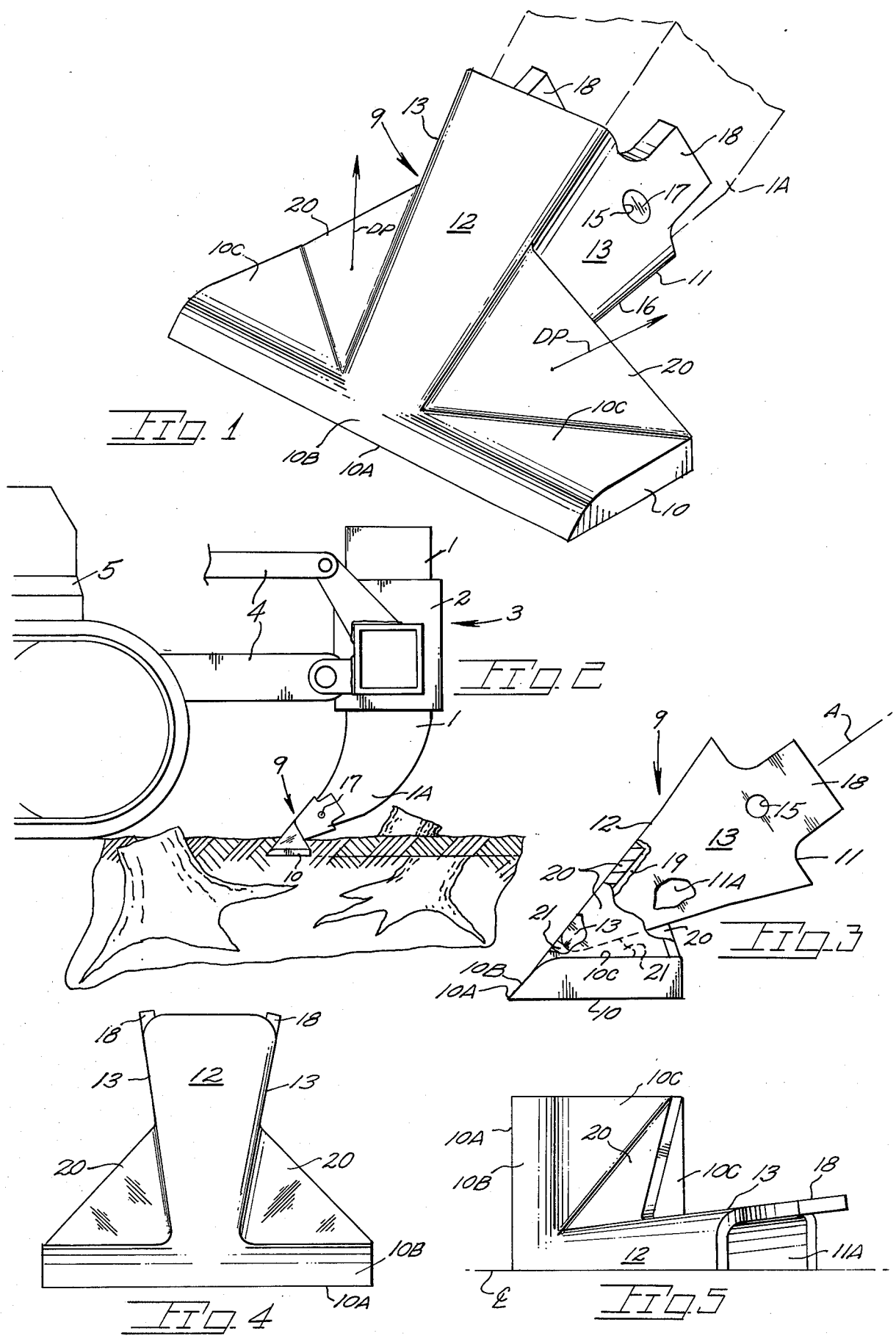

4,175,341

SUBSURFACE CUTTING TOOL FOR A TRACTOR RIPPER SHANK

BACKGROUND OF THE INVENTION

The present invention concerns a cutting tool adapted for attachment to the lower end of an earthworking shank for the purpose of performing below surface cutting operations.

In the construction of logging roads in the western part of the United States, it is common practice to use ground debris such as branches, stumps, etc., along with a graded earth matrix to provide fill material where required in such roads. As logging roads are for temporary use, the roadbed is normally unpaved. Use of such roads by log laden trucks over a period of time results in the roadbed being compacted and settling to the extent that the debris used in the roadbed often works its way to the surface. Such protruding debris must be periodically removed from the roadbed to prevent damage to truck tires which removal in the past has necessitated digging the obstruction free from the roadbed or digging around the obstruction to the extent a chain saw could be used to remove the protruding portion of the obstruction. Accordingly, the removal of obstructions from logging roadbeds is a time consuming task and hence contributes to costly road maintenance.

Known ripper tools are entirely impractical for removal of such roadway obstructions.

SUMMARY OF THE PRESENT INVENTION

The present invention is embodied within a subterranean cutting tool adapted for attachment to an earthworking shank such as a ripper shank installed on a crawler tractor.

The present tool includes a horizontally disposed blade block construction having a leading edge constituting a cutting edge which extends transversely across the blade. A socket is integral with the blade and extends upwardly and rearwardly therefrom to receive the inserted lower end of a ripper shank. A pin arrangement extends through the socket and ripper shank to removably mount the present tool. Extending intermediate the sidewalls of the socket and the blade upper surface are plates which function as moldboards to lift and outwardly displace the blade severed material. Accordingly all the material severed by the blade's leading edge is upwardly displaced from its semi-buried location and left exposed on the roadbed surface for subsequent removal.

Important objects of the present invention include; the provision of a cutting tool having a blade block which travels substantially parallel to and below the ground surface to sever, below ground, wooden obstructions protruding upwardly through a ground or roadbed surface; the provision of a tool which in addition to severing of an obstruction below ground surface, lifts the severed material toward the ground surface; the provision of a subsurface cutting tool readily adaptable to the lower end of a ripper shank to enable a crawler type tractor carrying a ripper to be used to rapidly remove obstructions protruding through a roadway surface without excessive roadbed disturbance.

BRIEF DESCRIPTION OF THE DRAWING

In the accompanying drawing:

FIG. 1 is a perspective view of the present cutting tool;

FIG. 2 is a side elevational view of a typical crawler tractor mounted ripper assembly with the present tool mounted on the ripper shank;

FIG. 3 is a side elevational view of the present tool removed from the ripper shank and with fragments broken away;

FIG. 4 is a front elevational view of FIG. 3, and;

FIG. 5 is a plan view of the present tool broken away along a vertical center line.

DETAILED DESCRIPTION OF THE PREFERRED EMBODIMENT

With continuing reference to the drawing, a ripper shank is indicated at 1 mounted in a holder 2 which comprises part of a ripper assembly indicated generally at 3. Commonly ripper assemblies are carried by arm linkage 4 of a crawler type tractor 5. The hydraulically positionable arms 4 raise and lower the ripper assembly 3 to determine the depth of the ground penetration by the ripper shank. Typically the lower ends of ripper shanks are provided with replaceable tips not presently used which are removably mounted by a transversely extending pin. The foregoing is intended to be typical of various ripper assembly arrangements and as same does not constitute part of the present invention may be treated in a brief manner.

With attention now to the present invention, the same is indicated generally at 9 and shown in place attached to the lower, forwardly directed end 1A of ripper shank 1. A blade block at 10 of the present tool terminates forwardly in a length cutting edge 10A disposed normal to block travel with a rearwardly inclined blade surface being indicated at 10B and an upper blade surface at 10C.

A socket 11 of the present tool defines an internal area 11A within which is received the end of ripper shank 1. Said socket includes a rearwardly inclined front wall 12, sidewalls 13 and a bottom wall 16. The foregoing walls of the socket converge downwardly and forwardly as do the corresponding inner surface of said walls which provide for surface engagement with the ripper shank end surfaces. For attachment of the present tool to the ripper shank, apertures at 15 in the tool sidewalls receive a transversly extending removable pin 17. Ears at 18 on said sidewalls further contribute to ripper shank-tool engagement.

Plates at 20 constitute debris deflector plates and extend intermediate socket 11, specifically sidewalls 13 thereof, and the upper surface 10C of blade block 10. Said plates are inclined upwardly and rearwardly along two axes and thereby function to divert severed objects upwardly and outwardly along paths DP of FIG. 1. Desirably, the plates are of diminishing heights from their socket attachment outwardly to the blade block ends. Additionally, the plates are rearwardly directed from socket attachment to facilitate passage of the tool through earthen material.

With attention to FIG. 3, it will be seen that welds as at 19 secure the innermost edges of deflector plates 20 to the socket sidewalls while an additional weld at 21 secures the socket forward end to top surface 10C of blade block 10.

In operation, the tool is attached to the ripper shank end by pin 17 whereupon the operator of vehicle 5 actuates linkage 4 to locate the blade block at a depth of several inches below the ground surface. Desirably blade block 10 will have a somewhat negative pitch or draft so as to compensate for any tendency of the tool to climb out of ground engagement. Accordingly the angular relationship of the major axis A of socket 11 and the upper surface of blade block 10 may be varied during tool manufacture to best suit ripper shank configuration to which the tool is to be mounted. In one form of the present invention the major axis A of the socket is approximately 35 degrees inclination from horizontal blade surface 10C of the blade block. Advance of the tool in a subterranean manner with block 10 spaced below the ground surface several inches results in underground obstructions such as stumps, limbs, small logs, etc., being rapidly severed by cutting edge 10A with the plates 20 and front wall 12 of the socket jointly serving to all impart upward displacement to such severed material. Tool operation does not cause severe disturbance of the roadbed and accordingly use of the road is not interrupted.

While I have shown but one embodiment of the tool, it will be apparent to those skilled in the art that the invention may be embodied still otherwise without departing from the spirit and scope of the invention.

Having thus described the invention, what is claimed and desired to be secured under a Letters Patent is:

1. A tool for cutting and lifting buried wooden debris for attachment to the ripper shank of a tractor, said tool comprising,
   a blade block for subterranean travel in a path substantially parallel to the ground surface, said blade block having a forward substantially straight cutting edge extending transversely across the blade block and disposed normal to the blade block path,
   a socket secured to said blade block and extending rearwardly and upwardly from said edge relative to the path of blade block travel, said socket adapted to lockably receive the lower end of the shank,
   debris deflector plates integral with said blade block and socket, each of said plates inclined upwardly and rearwardly along two axes so as to provide plate surfaces serving to elevate the severed material to the ground surface, and
   said socket and said plates jointly extending the length of the blade block to provide surfaces acting to elevate all of the debris severed by the blade block cutting edge.

2. The cutting tool claimed in claim 1 wherein the major axis of said socket and the blade define an angle of approximately thirty-five degrees.

* * * * *